United States Patent
Hsieh et al.

(10) Patent No.: US 11,762,376 B2
(45) Date of Patent: Sep. 19, 2023

(54) QUICK DISPATCHING RULE SCREENING METHOD AND APPARATUS

(71) Applicant: Industrial Technology Research Institute, Hsinchu (TW)

(72) Inventors: Tsung-Jung Hsieh, Tainan (TW); Shu-Hsuan Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 410 days.

(21) Appl. No.: 16/726,929

(22) Filed: Dec. 26, 2019

(65) Prior Publication Data
US 2021/0165395 A1    Jun. 3, 2021

(30) Foreign Application Priority Data
Dec. 3, 2019    (TW) ................... 108144124

(51) Int. Cl.
| | | |
|---|---|---|
| *G05B 19/41* | (2006.01) | |
| *G05B 19/418* | (2006.01) | |
| *G06Q 10/0631* | (2023.01) | |

(52) U.S. Cl.
CPC . *G05B 19/41865* (2013.01); *G06Q 10/06312* (2013.01); *G06Q 10/06313* (2013.01); *G05B 2219/32128* (2013.01); *G05B 2219/32306* (2013.01); *G05B 2219/34215* (2013.01)

(58) Field of Classification Search
CPC .................................................. G05B 19/41
See application file for complete search history.

(56) References Cited

U.S. PATENT DOCUMENTS

| | | |
|---|---|---|
| 5,493,501 A | 2/1996 | Kondo |
| 8,015,564 B1 | 9/2011 | Beyer et al. |
| 9,665,668 B2 | 5/2017 | Norman et al. |
| 10,157,355 B2 | 12/2018 | Johnson et al. |
| 2010/0332373 A1* | 12/2010 | Crabtree ............ G06Q 40/04 709/224 |

(Continued)

FOREIGN PATENT DOCUMENTS

| | | | |
|---|---|---|---|
| CA | 2636537 A1 * | 12/2009 | ........... G01C 21/343 |
| CN | 102737126 | 10/2012 | |

(Continued)

OTHER PUBLICATIONS

Kim, Dongwook, Learning dispatching rules via an association rule mining approach, Iowa State University, Ames, Iowa, 2015 (Year: 2015).*

(Continued)

*Primary Examiner* — Kurtis Gills
(74) *Attorney, Agent, or Firm* — JCIPRNET (57) ABSTRACT

A quick dispatching rule screening method and apparatus are provided. The quick dispatching rule screening method includes following steps. A scheduling result and a corresponding scenario are obtained. A dispatching rule mining table is established according to the scheduling result, where the dispatching rule mining table includes a dispatching rule and an operation. A participation rate of each dispatching rule in the dispatching rule mining table is calculated. A contribution rate is calculated according to the participation rate to obtain a filter value. A selected dispatching rule is decided according to the filter value.

24 Claims, 8 Drawing Sheets

(56) References Cited

U.S. PATENT DOCUMENTS

| | | | | |
|---|---|---|---|---|
| 2014/0148924 | A1* | 5/2014 | Brak | H01L 21/67757 |
| | | | | 700/12 |
| 2015/0046221 | A1* | 2/2015 | Narayan | G06Q 10/06 |
| | | | | 705/7.31 |
| 2017/0207633 | A1* | 7/2017 | Nakayama | H02J 3/382 |
| 2018/0082208 | A1 | 3/2018 | Cormier et al. | |
| 2018/0137168 | A1* | 5/2018 | Hama | G05B 19/418 |
| 2019/0146463 | A1* | 5/2019 | Hsieh | G06Q 10/0631 |
| | | | | 700/101 |
| 2019/0324487 | A1* | 10/2019 | Elbsat | G05F 1/66 |

FOREIGN PATENT DOCUMENTS

| | | |
|---|---|---|
| CN | 103413771 | 1/2016 |
| CN | 108549977 | 9/2018 |
| CN | 109523136 | 3/2019 |
| CN | 109543912 | 3/2019 |
| CN | 109636011 | 4/2019 |
| JP | 2007087421 | 4/2007 |
| TW | I250426 | 3/2006 |
| TW | I296096 | 4/2008 |
| TW | I633504 | 8/2018 |

OTHER PUBLICATIONS

Dongwook Kim, Learning dispatching rules via an association rule mining approach, Iowa State University Ames, Iowa 2015. (Year: 2015).*

"Office Action of Taiwan Counterpart Application", dated Oct. 12, 2020, p. 1-p. 5.

Soeren Bergmann, et al., "Approximation of dispatching rules for manufacturing simulation using data mining methods." 2015 Winter Simulation Conference, Dec. 6-9, 2015, pp. 2329-2340.

* cited by examiner

| Rule | PD | RT | DS | SK | ... | DS_PT | DS_OPN | LWORK | MWORK | NINQ | WINQ |
|---|---|---|---|---|---|---|---|---|---|---|---|
| Participation rate | 0.143 | 0.571 | 0.14 | 0.143 | ... | 0.2857 | 0.14286 | 0.14286 | 0 | 0 | 0 |

| Rule | PD | RT | DS | SK | ... | DS_PT | DS_OPN | LWORK | MWORK | NINQ | WINQ |
|---|---|---|---|---|---|---|---|---|---|---|---|
| Up | 0.12 | 0.2 | 0.15 | 0.16 | ... | 0.17 | 0.16 | 0.12 | 0.12 | 0.09 | 0.16 |
| Down | 0.18 | 0.39 | 0.16 | 0.26 | ... | 0.41 | 0.34 | 0.21 | 0.14 | 01 | 0.16 |

FIG. 5A

Filter value = (average participation rate of Up + average participation rate of Down)
× average participation rate of Down / average participation rate of Up

| Rule | PD | RT | DS | SK | ... | DS_PT | DS_OPN | LWORK | MWORK | NINQ | WINQ |
|---|---|---|---|---|---|---|---|---|---|---|---|
| Participation rate | 0.45 | 1.1505 | 0.331 | 0.683 | ... | 1.3988235 | 1.0625 | 0.5775 | 0.303333333 | 0.211111 | 0.32 |

QUICK DISPATCHING RULE SCREENING METHOD AND APPARATUS

CROSS-REFERENCE TO RELATED APPLICATION

This application claims the priority benefit of Taiwan application serial no. 108144124, filed on Dec. 3, 2019. The entirety of the above-mentioned patent application is hereby incorporated by reference herein and made a part of this specification.

TECHNICAL FIELD

The technical field relates to a quick dispatching rule screening method and apparatus.

BACKGROUND

Currently, a dispatching rule is selected manually or empirically by making a subjective judgment according to a current condition of a production environment. However, there are a variety of selectable dispatching rules and combinations thereof. Conventionally, a proper dispatching rule is screened out based on a scheduling result that is output by a regular simulation program, which is cost and time consuming, and it is uneasy to screen out the dispatching rule suitable for a current corresponding scenario within an effective time frame at a work site where productivity is one of the main considerations, and a mechanism of quickly obtaining a dispatching rule may be required. Therefore, how to perform quick dispatching rule screening is one of current research and development topics.

SUMMARY

The disclosure relates to a quick dispatching rule screening method and apparatus.

According to an embodiment of the disclosure, a quick dispatching rule screening method is provided. The quick dispatching rule screening method includes following steps: obtaining a scheduling result and a corresponding scenario; establishing a dispatching rule mining table according to the scheduling result, where the dispatching rule mining table includes a dispatching rule and an operation; calculating a participation rate of each dispatching rule in the dispatching rule mining table; and calculating a contribution rate according to the participation rate to obtain a filter value, and deciding a selected dispatching rule based on the filter value.

According to another embodiment of the disclosure, a quick dispatching rule screening apparatus is provided. The quick dispatching rule screening apparatus includes a data unit and a mining unit. The data unit obtains a scheduling result or a corresponding scenario. The mining unit is coupled to the data unit, establishes a dispatching rule mining table according to the scheduling result, where the dispatching rule mining table includes a dispatching rule and an operation, calculates a participation rate of each dispatching rule in the dispatching rule mining table, calculates a contribution rate according to the participation rate to obtain a filter value, and decides a selected dispatching rule based on the filter value.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Technical terms in the specification refer to customary terms in the technical field. If some terms are explained or defined in the specification, the terms are translated according to the explanation or definition in the specification. Embodiments of the disclosure each include one or more technical features. Where possible, persons of ordinary skill in the art may selectively implement some or all of the technical features of any embodiment, or selectively combine some or all of the technical features of such embodiments.

Figure 1:
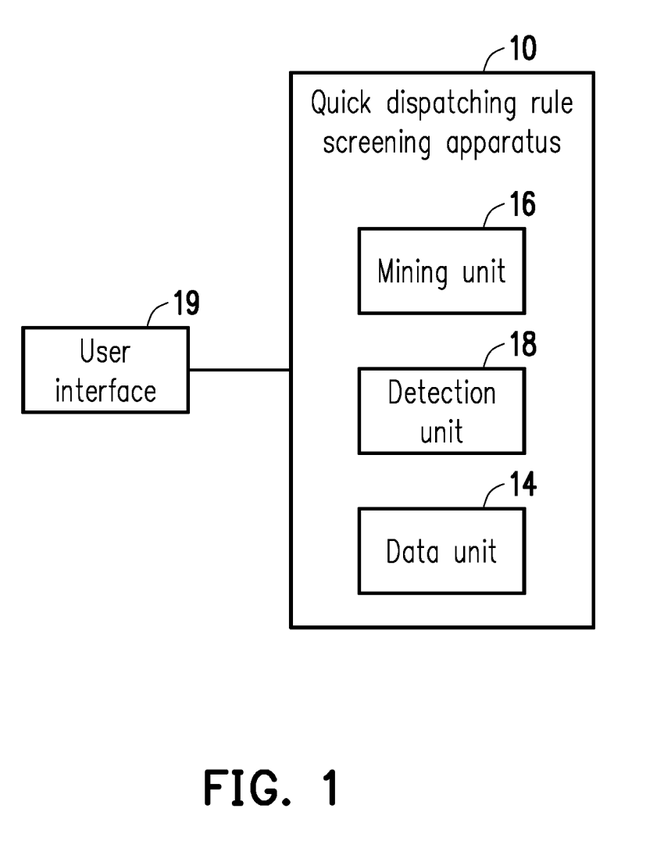
FIG. 1 is a schematic block diagram of a quick dispatching rule screening apparatus according to an embodiment of the disclosure.

FIG. 1 is a schematic block diagram of a quick dispatching rule screening apparatus 10 according to an embodiment of the disclosure. The quick dispatching rule screening apparatus 10 includes a data unit 14 and a mining unit 16. The mining unit 16 is coupled to the data unit 14.

In an embodiment, the data unit 14 and the mining unit 16 may be hardware, for instance, a central processing unit (CPU) or other programmable general-purpose or special-purpose micro control units (MCUs), a microprocessor, a digital signal processor (DSP), a programmable controller, an application-specific integrated circuit (ASIC), a graphics processing unit (GPU), an arithmetic logic unit (ALU), a complex programmable logic device (CPLD), a field programmable gate array (FPGA), or other similar elements, or a combination thereof. In an embodiment, the data unit 14 and the mining unit 16 may include firmware, the hardware, and/or software or machine executable program code stored in a memory and loaded, read, written, and/or executed by the hardware. The disclosure is not limited thereto.

In an embodiment, the memory of the data unit 14 may be hardware with a memory or storage function, and the memory or storage hardware is, for instance, a volatile memory or a non-volatile memory, or any form of fixed or movable random access memory (RAM), a register, a read-only memory (ROM), a flash memory, a hard disk drive (HDD), a solid state drive (SSD), or a similar element, or a combination thereof. The data unit 14 may store at least one scheduling result and at least one corresponding scenario, as well as a corresponding original dispatching rule.

In an embodiment, a user interface 19 may be an apparatus with a display function, for instance, a screen, a mobile phone, a computer, a terminal, or a notebook computer. The disclosure is not limited thereto.

Figure 2A:
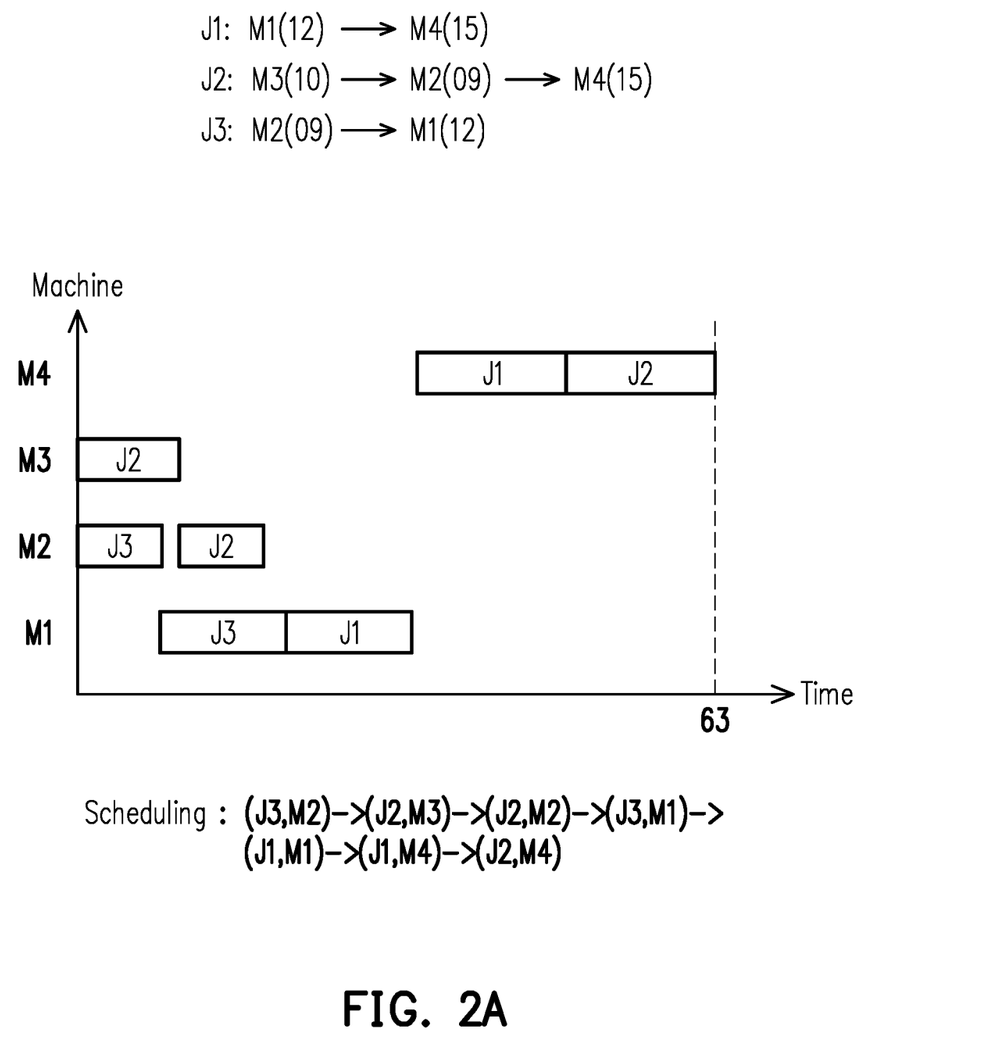
FIG. 2A and FIG. 2B are schematic example diagrams of a mining unit according to an embodiment of the disclosure.
Figure 2B:
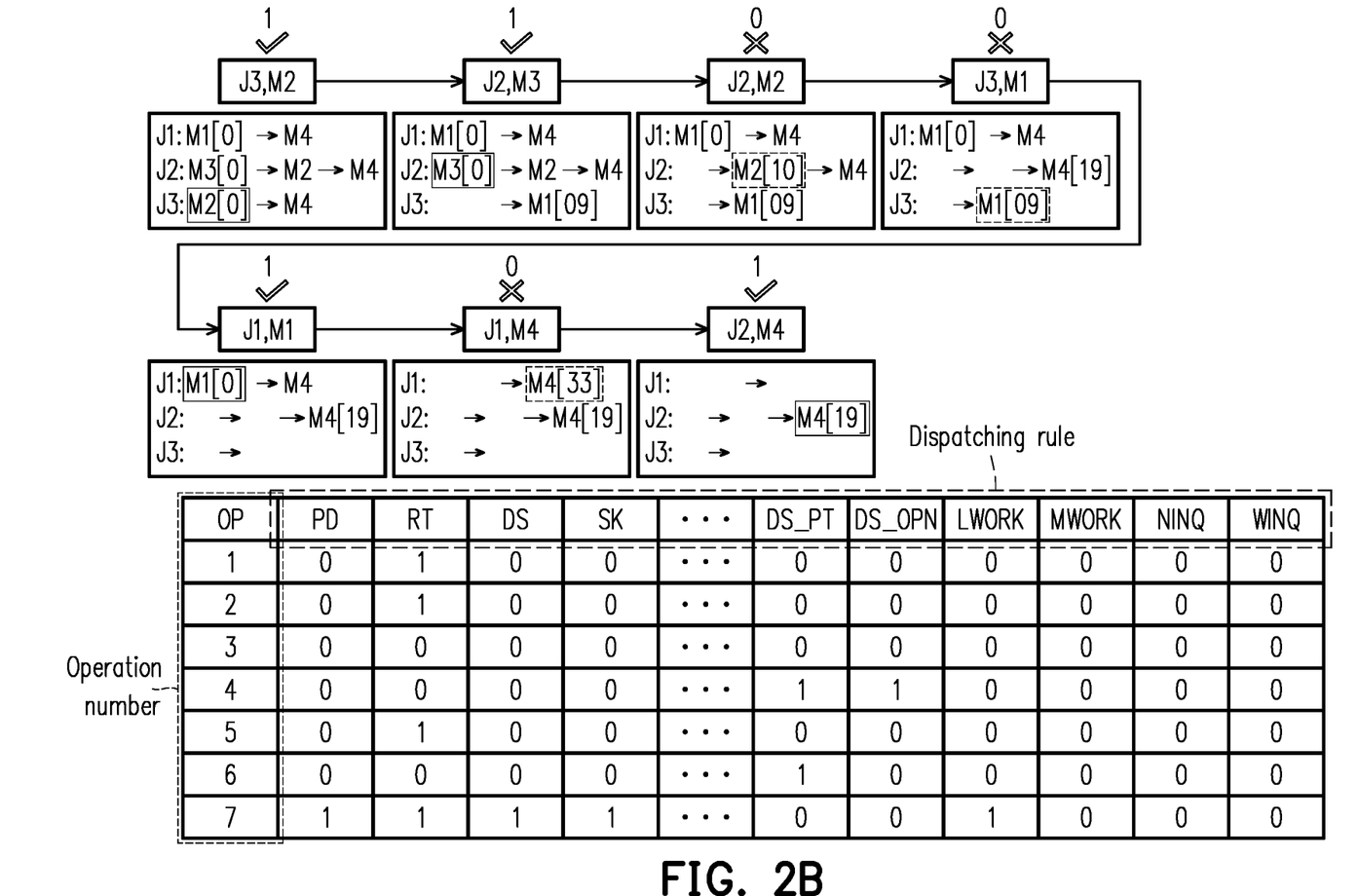

In an embodiment, the mining unit 16 may derive a possibly selected dispatching rule according to a scheduling result and a corresponding scenario that are stored, acquired, or calculated by the data unit 14. For instance, for a given scheduling result and corresponding scenario, a dispatching rule most suitable to the scheduling result may be found through even mining. FIG. 2A and FIG. 2B are schematic example diagrams of a mining unit according to an embodiment of the disclosure. The scheduling result may be, for instance, a Gantt chart. The corresponding scenario may be, for instance, a printed circuit board (PCB) field. Available resources are, for instance, a machine and a work order. Acquiring four machines and three work orders may be considered as an existing field scheduling result. The disclosure is not limited thereto. A scheduling target of this application example is that a finish time point of a last process is earliest. A Gantt chart in this example is generated by using a regular scheduling technology.

Referring to FIG. 2A, in an embodiment, there are four machines: M1, M2, M3, and M4, three work orders: J1, J2, and J3, and a total of seven operations (OPs): M2(09), M3(10), M2(09), M1(12), M1(12), M4(15), and M4(15). The operations are sequentially numbered 1 to 7. Specifically, M2(09) is an operation 1, M3(10) is an operation 2, . . . , and M4(15) is an operation 7. M1(12)→M4(15) is a process of the work order 1, M3(10)→M2(09)→M4(15) is a process of the work order 2, and M2(09)→M1(12) is a process of the work order 3. 09 of M2(09) represents that the machine 2 requires 9 time units to finish execution if starting at a time unit 0. 0 is a start time, and 9 is an end time, which are collectively referred to as a start-end time. In an embodiment, a process and a start-end time are included in a corresponding scenario.

In FIG. 2A, J1:M1(12)→M4(15) indicates that for the work order J1, the machine M1 first consumes 12 time units to complete the operation M1(12), and then the machine M4 consumes 15 time units to complete the operation M4(15), thereby completing the process M1(12)→M4(15) in J1; for J2, a process of operations M3(10), M2(09), and M4(15) is sequentially completed; for J3, a process of operations M2(09) and M1(12) is sequentially completed.

A scheduling target of this example is that a finish time point of a last process is earliest. Therefore, in a dispatching rule mining table of FIG. 2B, a horizontal axis of the table shows dispatching rules, and a vertical axis shows operation numbers. For the dispatching rules herein, refer to Table 1. Table 1 shows definitions of dispatching rules. Types of dispatching rules of the disclosure are not limited to Table 1. In an embodiment, the dispatching rule mining table may be stored in the data unit 14.

| Factor | Dispatching Number | Dispatching rule | Name of dispatching rule | Explanation | Expect a large/small value |
|---|---|---|---|---|---|
| Time | 1 | PD | Dynamic yield multiple | ((Due date - time at which a previous process is finished)/left work time | Small |
| Time | 2 | RT | First come first service | Time at which a previous process is finished | Small |
| Time | 3 | DS | Maximum buffer time | Due date - time at which a previous process is finished - left work time | Small |
| Time | 4 | SK | Current time progress of semi-finished product | Time at which a previous process is finished | Small |
| Order VS Time | 5 | LPT | Work time for to-be-executed operation long | Longer work time being prioritized | Large |
| Order VS Time | 6 | SPT | Work time for to-be-executed operation short | Shorter work time being prioritized | Small |
| Order | 7 | FOPNR | Quantity of left operations_small (quantity) | Fewer left processes being prioritized | Small |
| Order | 8 | MOPNR | Quantity of left operations_large (quantity) | More left processes being prioritized | Large |
| Plenty of time VS Order | 9 | S_OPN | Order emergency degree_operation quantity aspect | SLACK/quantity of left processes | Small |
| Plenty of time VS Time | 10 | S_PT | Order emergency degree_time aspect | SLACK/left work time | Small |
| Plenty of time VS Order VS Time | 11 | DS_PT | Delay crisis level_time aspect | DS/left work time | Small |
| Plenty of time VS Order | 12 | DS_OPN | Delay crisis level_operation quantity aspect | DS/quantity of left processes | Small |
| Order VS Time | 13 | LWORK | Measure order backlog less | Less left work time being prioritized | Small |
| Order VS Time | 14 | MWORK | Measure order backlog more | More left work time being prioritized | Small |
| Machine VS Order | 15 | NINQ | Machine resource competition degree_low | Waiting fewer processes on a machine being prioritized | Small |

| Factor | Dispatching Number rule | Name of dispatching rule | Explanation | Expect a large/small value |
|---|---|---|---|---|
| Machine VS Order | 16 | WINQ | Machine resource competition degree_high | Waiting less work time on a machine being prioritized | Small |

Figure 3:
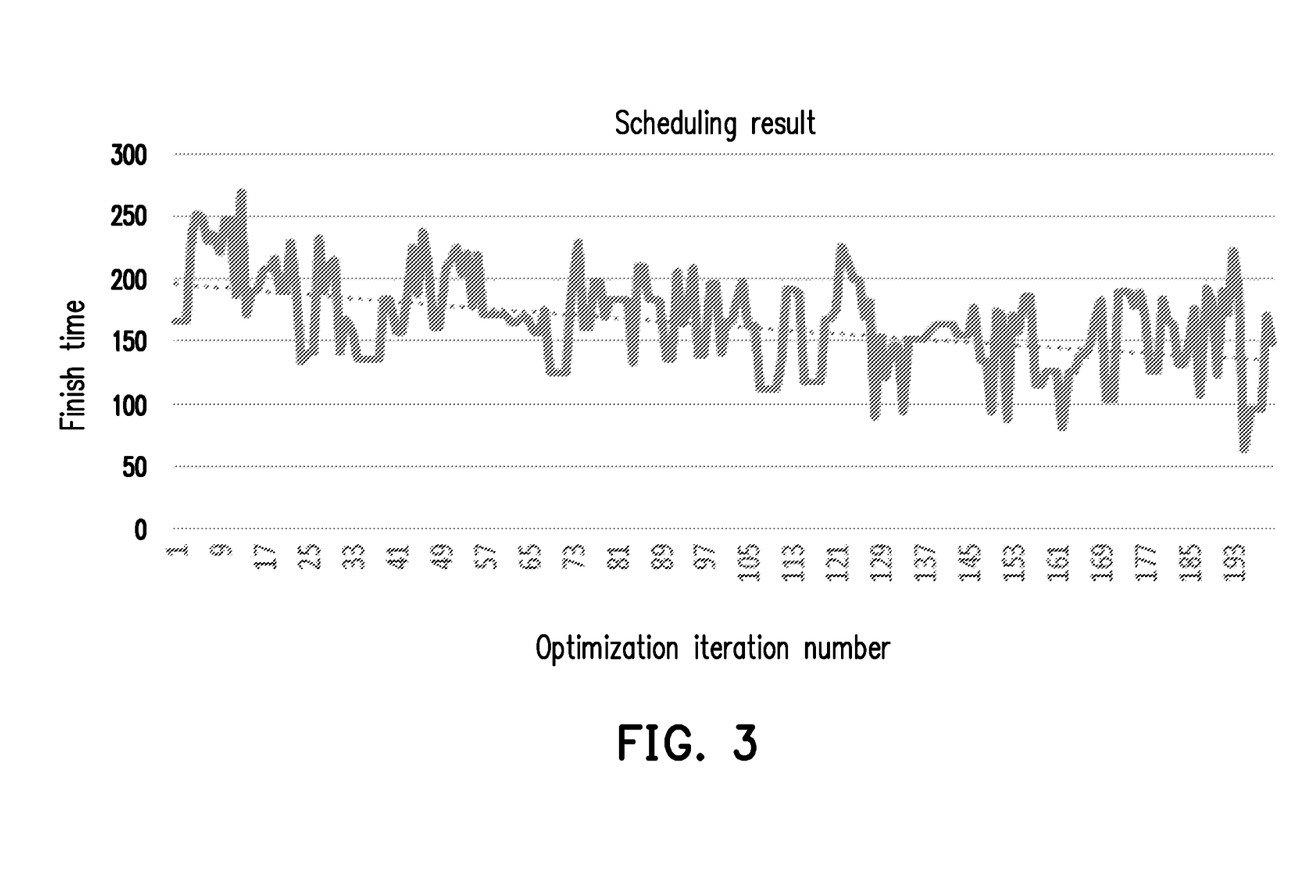
FIG. 3 is a schematic Gantt chart of scheduling data of regular mining according to another embodiment of the disclosure.

In an embodiment, the Gantt chart of the scheduling result of FIG. 2A may be generated by the data unit 14 according to an optimal approximate solution technology, and stored in the data unit 14. According to the technology, an optimal approximate solution is obtained through convergence algorithm. The mining unit 16 obtains the Gantt chart of FIG. 2A that is generated by the data unit 14 by using, for instance, a GA. In the chart, 63 time units are consumed to finish a process of M2(09), M3(10), M2(09), M1(12), M1(12), M4(15), and M4(15) in sequence. FIG. 3 is a schematic example diagram of completing convergence by using the GA according to an embodiment of the disclosure. An X axis represents a quantity of times that the GA is executed, and a Gantt chart is generated every time the GA is executed. A Y axis represents finish time units, which is a shortest finish time. It can be learned from the figure that, when the GA is executed more times, a finish time is shorter, so that an optimal approximate solution may be obtained through convergence. That is, a plurality of dispatching rules are obtained to satisfy a shortest finish time. An optimal approximate solution generator may use an irregular scheduling technology, which has an optimization program. The program may keep searching in a direction to an optimal scheduling solution to obtain an approximate optimal scheduling result. The disclosure is not limited to the GA used above. For instance, an evolutionary algorithm may alternatively be used to complete the foregoing function.

Figure 4:
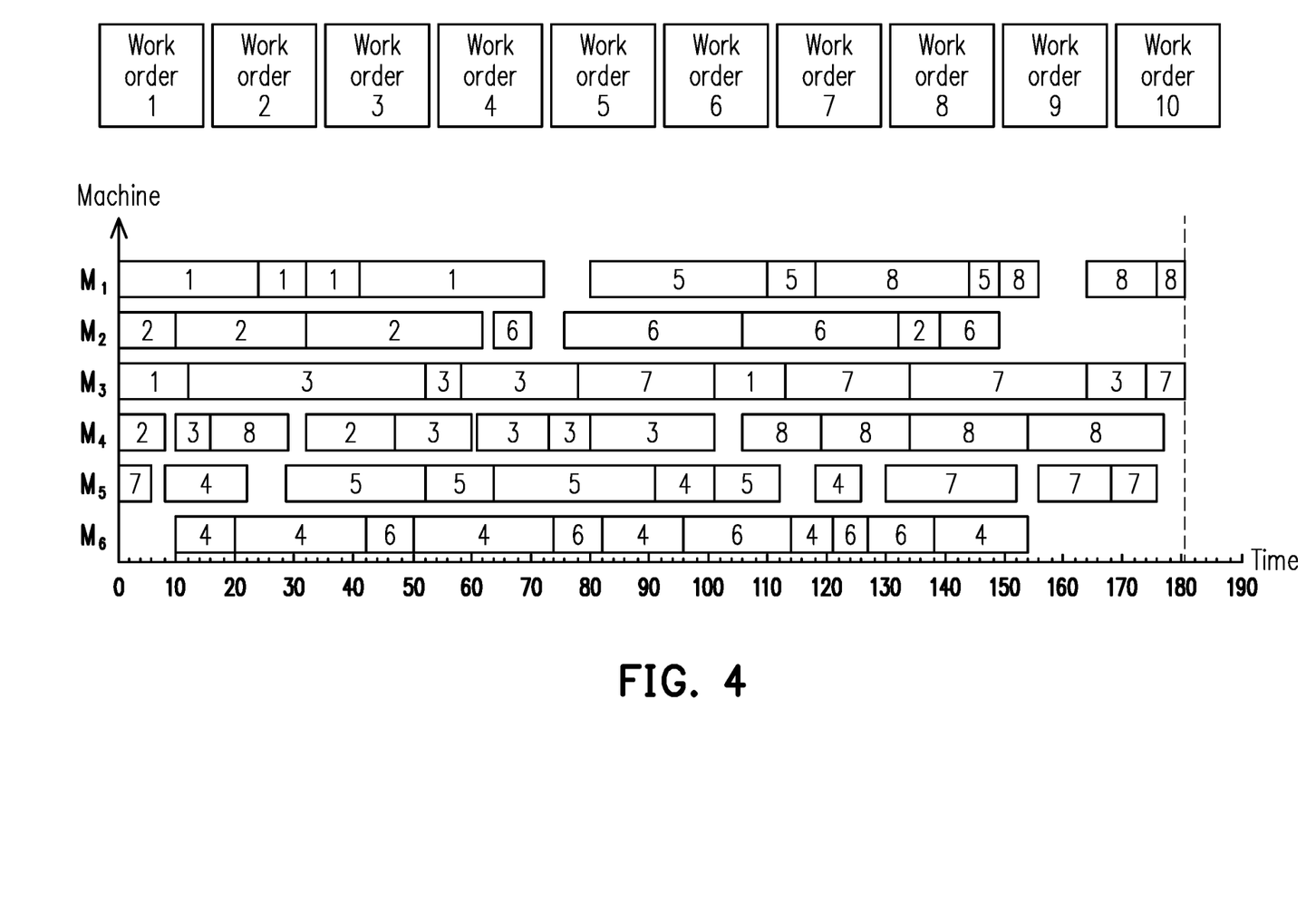
FIG. 4 is a schematic example diagram of completing convergence by using a genetic algorithm (GA) according to an embodiment of the disclosure.

The Gantt chart of FIG. 2A may alternatively be acquired by the data unit 14 from a process and corresponding work time of a recent short work order of a computer device manufacturer, referring to FIG. 4. FIG. 4 a schematic Gantt chart of scheduling data of regular mining according to another embodiment of the disclosure. The disclosure is not limited thereto.

In an embodiment, for the mining unit 16, the dispatching rule of first come first service (RT) is used. According to the dispatching rule, a process started at an earlier time is prioritized. In FIG. 2B, a number in [number] represents a time point at which a to-be-executed process of the work order may be executed. According to the RT, execution starts at a time unit 0, and the data unit 14 obtains a Gantt chart. If M2(9) of an operation number 1 of started J3 is served first, the machine M2 first serves 9 time units. Since the RT is met, that is, the dispatching rule RT is met, an RT field, corresponding to the operation number 1, of a dispatching rule set table may be represented by a binary code 1. When execution starts at the time unit 0, if M3(10) of an operation number 2 of started J2 is served first, the machine M3 first serves 10 time units. Since the RT is met, that is, the dispatching rule RT is met, an RT field, corresponding to the operation number 2, of the dispatching rule set table may be represented by the binary code 1. When execution starts at the time unit 0, if M2(09) of an operation number 3 of started J2 is served first, the machine M2 first serves 9 time units. Since the RT is not met, that is, the dispatching rule RT is not met, an RT field, corresponding to the operation number 3, of the dispatching rule set table may be represented by a binary code 0. In this way, 1100101 in RT fields of the dispatching rule set table of FIG. 2B may be obtained. Different dispatching rules are deduced in the same manner. For instance, PD fields are 0000001, where the PD is "dynamic yield multiple" in Table 1. In this way, the dispatching rule set table in FIG. 2B can be fully filled.

Figure 5A:
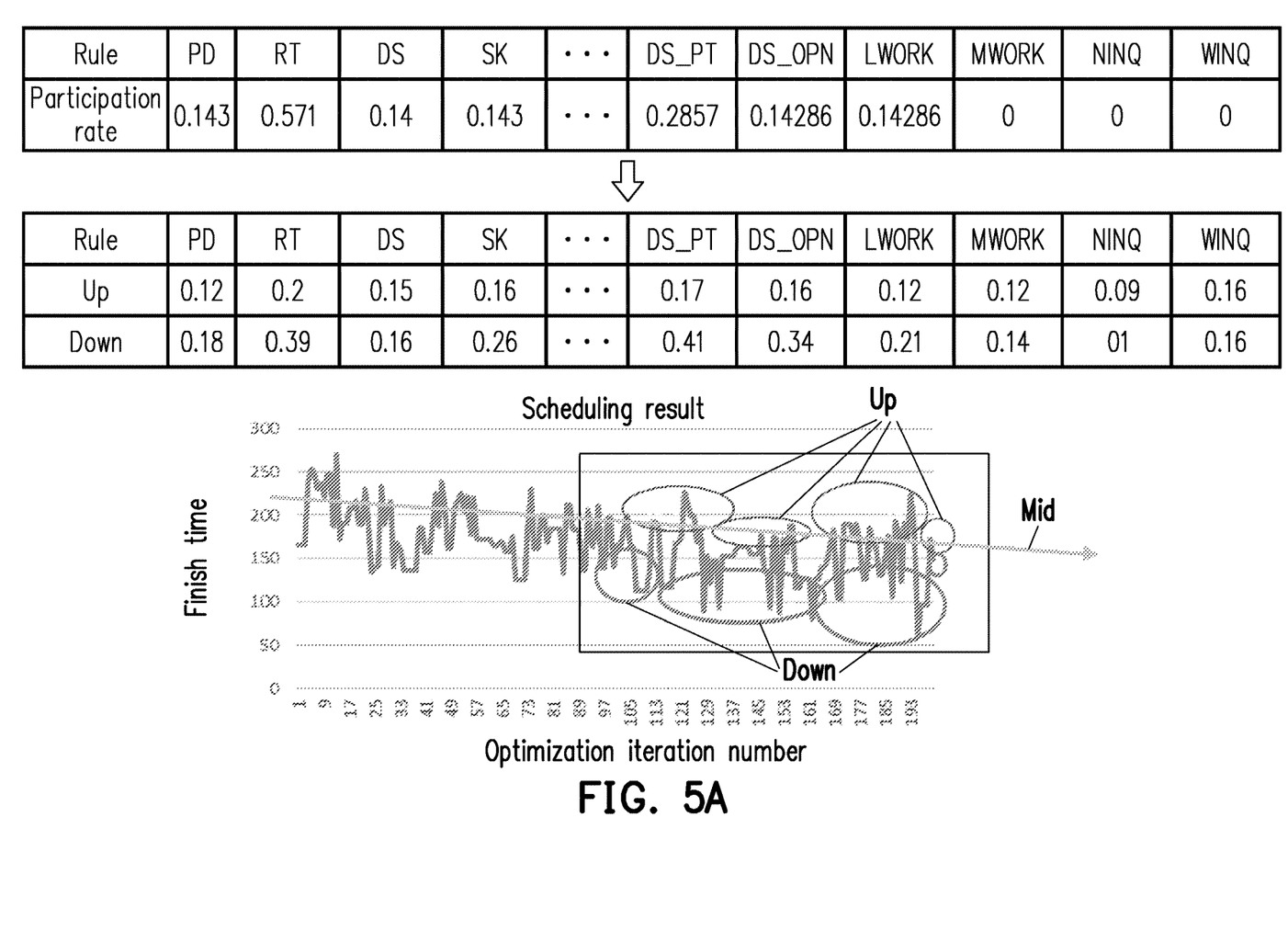
FIG. 5A and FIG. 5B are schematic example diagrams of acquiring a dispatching rule by using a dispatching rule mining table established based on a plurality of solutions according to an embodiment of the disclosure.
Figure 5B:
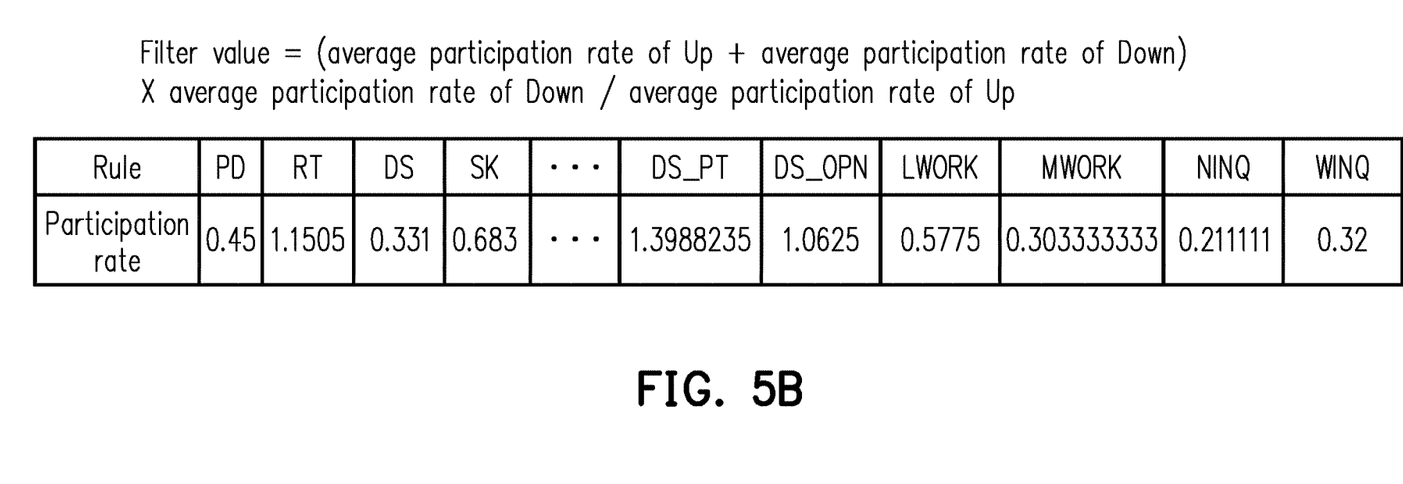

In an embodiment, FIG. 5A and FIG. 5B are schematic example diagrams of acquiring a dispatching rule by using a dispatching rule mining table established based on a plurality of solutions according to an embodiment of the disclosure. In the mining unit 16, if the Gantt chart of FIG. 2A is executed 200 times, 200 Gantt charts are generated. A participation rate may be based on an appearance rate of a dispatching rule. For instance, in participation rates in FIG. 5A, 0.143 of the PD is obtained from 1/7 according to quantities of 0 and 1 in the PD fields of the dispatching rule mining table; for the RT fields, 0.571 is obtained from 4/7. In this example, a total quantity of operations is 7. The participation rate may be obtained by, for instance, dividing a quantity of dispatching rule fields where the dispatching rule is satisfied of the dispatching rule mining table by the total operation quantity.

In an embodiment, referring to FIG. 5B, a contribution rate may be screened out according to contribution degrees of the dispatching rule to a plurality of solutions. The contribution rate may be used to calculate average participation rates of Up and Down. In the mining unit 16, for FIG. 5A showing cross-sectioning of FIG. 3, the average participation rate of Up, that is, an upper part, is obtained above a section line; and the average participation rate of Down, that is, a lower part, is obtained below the section line. The mining unit 16 of the present embodiment obtains Gantt chart data of the $97^{th}$ time to the $200^{th}$ time, 103 times in total, that is, obtains an optimal solution area of a shortest finish time. If a quantity of times of Up is 51, a quantity of times of Down is 52. The average participation rate of Up in the PD fields of FIG. 5B is $\Sigma 51$ participation rates/51=average participation rate of Up, which is 0.12 herein. The average participation rate of Down in the PD fields is $\Sigma 51$ participation rates/52=average participation rate of Down, which is 0.18 herein. Other dispatching rules are deduced by analog. The contribution rate may be obtained by, for instance, calculating an average of a plurality of the participation rates above the section line and a plurality of the participation rates below the section line.

In an embodiment, in the mining unit 16, for calculation of a filter value, refer to the following equation 1:

$$\text{Filter value} = (\text{average participation rate of Up} + \text{average participation rate of Down}) \times \text{average participation rate of Down}/\text{average participation rate of Up} \quad (1)$$

A filter value of the PD field in FIG. 5B is 0.45. A higher filter value is better herein, to satisfy a dispatching rule in Table 1 expecting a small value, and according to a selected dispatching rule, a high filter value is selected. In FIG. 5B, for instance, RT, DS_PT, and DS_OPN may be selected. DS_PT is "delay crisis level time aspect", DS_OPN is "delay crisis level_operation quantity aspect". For a dispatching rule expecting a large value, a filter value is calculated according to the following equation 2:

Filter value=(average participation rate of Up+average participation rate of Down)×average participation rate of Up/average participation rate of Down     (2)

The filter value may be obtained by, for instance, summation, multiplication, and division on a plurality of the contribution rates. Any method within the filter value calculation spirit may be used, and the filter value of the disclosure is not limited to the foregoing equation.

In an embodiment, the user interface 19 is included. The user interface 19 inputs a scheduling result and a corresponding scenario, selects a scheduling target and available resources, and outputs a selected dispatching rule.

In an embodiment, the quick dispatching rule screening apparatus 10 includes a detection unit 18. The detection unit 18 is coupled to the mining unit 16 and the data unit 14. The detection unit 18 may be a hardware combination the same as the hardware combination of the mining unit 16. The descriptions thereof are omitted herein. The detection unit 18 detects a similarity between the selected dispatching rule and an original dispatching rule of the scheduling result and the corresponding scenario obtained by the data unit 14. The mining unit 16 performs calculation a plurality of times for selected dispatching rules, which are arranged in ascending order of filter values, and then compared with original dispatching rules in the data unit 14. Referring to Table 2, Table 3, and Table 4, 10 data sets are simulated by using a field scenario of 15 work orders and 5 machines (in an embodiment, the field scenario is included in a corresponding scenario), and a work time ranges from 1 to 100. In Table 2, a vertical axis shows original dispatching rules, and a horizontal axis shows data sets, an average, and a ranking. The dispatching rule ranking is as follows: the RT ranks first, the MOPNR (quantity of left operations_large (quantity)) ranks second, the S_OPN (order emergency degree_operation quantity aspect) ranks third, the NINQ (machine resource competition degree_low) ranks fourth, the WINQ (Machine resource competition degree_high) ranks fifth, and for the rest, refer to Table 2. In Table 3, a horizontal axis shows dispatching rules, and a vertical axis shows data sets, an average, and a ranking. The dispatching rule ranking is as follows: the RT ranks first, the S_OPN ranks second, the MWKR (measure order backlog less) ranks third, the MOPNR ranks fourth, the SK (current time progress of semi-finished product) ranks fifth, and for the rest, refer to Table 3. In Table 4, a vertical axis shows a ranking of original dispatching rules and a ranking of selected dispatching rules of the disclosure, and a horizontal axis shows dispatching rules. A similarity relationship between the two rankings may be obtained by calculating a correlation therebetween by using, for instance, a Pearson correlation coefficient method. The method is widely used to measure a degree of linear dependence between two variables. After the two rankings are substituted, a value 0.8 may be obtained, which represents a high correlation, that is, a similarity of the disclosure is high. Therefore, a ranking similarity between the selected dispatching rules and the original dispatching rules is high, and the selected dispatching rules can replace the original dispatching rules, to save time required for regular dispatching rule simulation and dispatching rule screening. The disclosure may select any method that can be used to calculate a degree of linear dependence between two variables, and is not limited to the Pearson correlation coefficient method.

TABLE 2

| Dispatching rule | Data set 1 | Data set 2 | Data set 3 | Data set 4 | Data set 5 | Data set 6 | Data set 7 | Data set 8 | Data set 9 | Data set 10 | Average | Ranking |
|---|---|---|---|---|---|---|---|---|---|---|---|---|
| PD | 1010.8 | 1071.4 | 956.4 | 841.4 | 862 | 647.8 | 633 | 662.6 | 608.4 | 716.6 | 801.04 | 12 |
| RT | 896.8 | 985.8 | 864 | 808 | 862 | 610 | 633 | 600 | 591 | 715 | 756.56 | 1 |
| DS | 1021.2 | 1071.2 | 958.8 | 852 | 863.4 | 662.2 | 633.4 | 665.2 | 618 | 718.2 | 806.52 | 14 |
| SK | 994.4 | 1052 | 962 | 832.6 | 862 | 612.4 | 633 | 673 | 600.4 | 715 | 793.68 | 9 |
| LPT | 1010 | 1100 | 952.4 | 844.2 | 883.4 | 649.2 | 641 | 644.4 | 622.2 | 720 | 806.68 | 15 |
| SPT | 965 | 1052.8 | 932 | 856.4 | 866.4 | 625.2 | 639.6 | 630.4 | 605 | 715 | 788.78 | 7 |
| FOPNR | 998 | 1092.6 | 967.8 | 845.2 | 866 | 662.4 | 639.2 | 648.8 | 630.8 | 729.4 | 808.02 | 16 |
| MOPNR | 977 | 1038 | 903 | 831.8 | 862 | 610 | 633 | 628.2 | 591 | 715 | 778.9 | 2 |
| S_OPN | 986.2 | 1049.8 | 930.2 | 831.8 | 862 | 610 | 633 | 640.4 | 591 | 715 | 784.94 | 3 |
| S_PT | 996.6 | 1053 | 958.6 | 827.6 | 862 | 612.8 | 633 | 678.2 | 596.2 | 715 | 793.3 | 8 |
| DS_PT | 1018.4 | 1053 | 952.6 | 836.6 | 862.8 | 625.4 | 633 | 670 | 606 | 724.8 | 798.26 | 10 |
| DS_OPN | 1017.2 | 1068.4 | 961 | 838.6 | 862 | 644.2 | 633 | 660.4 | 604.8 | 718.4 | 800.8 | 11 |
| LWKR | 995.6 | 1079.8 | 937.4 | 870.2 | 873.8 | 630.8 | 637.6 | 645.4 | 630.6 | 717.2 | 801.8 | 13 |
| MWKR | 986.2 | 1035.6 | 944.4 | 833.2 | 862 | 610 | 633 | 669.4 | 597.6 | 715 | 788.64 | 6 |
| NINQ | 981.2 | 1061.2 | 930.8 | 841 | 863.2 | 621.4 | 633 | 629.2 | 592.6 | 715 | 786.86 | 4 |
| WINQ | 1010.8 | 1071.4 | 956.4 | 841.4 | 862 | 647.8 | 633 | 662.6 | 608.4 | 716.6 | 801.04 | 5 |

TABLE 3

| Rule | PD | RT | DS | SK | LPT | SPT | FOPNR | MOPNR |
|---|---|---|---|---|---|---|---|---|
| 1 | 31.88 | 510.37 | 158.18 | 200.00 | 160.00 | 160.00 | 100.00 | 260.00 |
| 2 | 82.09 | 555.30 | 92.00 | 280.00 | 180.00 | 160.00 | 100.00 | 160.00 |
| 3 | 141.01 | 626.40 | 168.67 | 194.13 | 148.15 | 175.68 | 105.00 | 219.51 |
| 4 | 145.07 | 572.83 | 150.71 | 180.00 | 120.00 | 160.00 | 100.00 | 300.00 |
| 5 | 168.00 | 518.13 | 106.07 | 216.42 | 136.22 | 212.16 | 100.00 | 326.02 |
| 6 | 57.49 | 534.00 | 79.44 | 208.25 | 144.09 | 204.07 | 63.56 | 181.62 |
| 7 | 134.40 | 549.17 | 86.30 | 320.00 | 180.00 | 120.00 | 40.00 | 160.00 |
| 8 | 104.73 | 543.04 | 120.00 | 220.00 | 120.00 | 140.00 | 160.00 | 320.00 |
| 9 | 127.13 | 550.57 | 129.06 | 160.00 | 120.00 | 180.00 | 80.00 | 140.00 |
| 10 | 76.90 | 616.60 | 140.63 | 320.00 | 120.00 | 100.00 | 100.00 | 180.00 |
| Average | 106.87 | 557.64 | 123.11 | 229.88 | 142.85 | 161.19 | 94.86 | 229.84 |

TABLE 3-continued

| Ranking | 16 | 1 | 11 | 5 | 10 | 7 | 15 | 4 |
|---|---|---|---|---|---|---|---|---|
| Rule | S_OPN | S_PT | DS_PT | DS_OPN | LWKR | MWKR | NINQ | WINQ |
| 1 | 240.00 | 200.00 | 31.88 | 93.33 | 40.00 | 200.00 | 180.00 | 180.00 |
| 2 | 280.00 | 280.00 | 82.09 | 84.00 | 100.00 | 280.00 | 80.00 | 80.00 |
| 3 | 316.49 | 194.13 | 141.01 | 87.27 | 138.88 | 194.13 | 159.96 | 166.05 |
| 4 | 240.00 | 180.00 | 145.07 | 133.53 | 140.00 | 180.00 | 120.00 | 120.00 |
| 5 | 253.00 | 216.42 | 168.00 | 72.00 | 166.49 | 216.42 | 119.12 | 117.86 |
| 6 | 232.26 | 208.25 | 57.49 | 53.17 | 116.13 | 208.25 | 144.09 | 144.09 |
| 7 | 260.00 | 320.00 | 134.40 | 64.62 | 120.00 | 320.00 | 200.00 | 200.00 |
| 8 | 300.00 | 220.00 | 104.73 | 107.63 | 80.00 | 220.00 | 260.00 | 220.00 |
| 9 | 160.00 | 160.00 | 127.13 | 97.14 | 160.00 | 160.00 | 140.00 | 140.00 |
| 10 | 300.00 | 320.00 | 76.90 | 159.23 | 120.00 | 320.00 | 160.00 | 160.00 |
| Average | 258.18 | 224.58 | 106.87 | 95.19 | 118.15 | 229.88 | 156.32 | 152.80 |
| Ranking | 2 | 6 | 13 | 14 | 12 | 3 | 8 | 9 |

TABLE 4

| | Applied dispatching rule | | | | | | | | | | | | | | |
|---|---|---|---|---|---|---|---|---|---|---|---|---|---|---|---|
| | PD | RT | DS | SK | LPT | SPT | FOPNR | MOPNR | S_OPN | S_PT | DS_PT | DS_OPK | LWKR | MWKR | NINQ | WINQ |
| Implementation ranking | 12 | 1 | 14 | 9 | 15 | 7 | 16 | 2 | 3 | 8 | 10 | 11 | 13 | 6 | 4 | 5 |
| Ranking of the disclosure | 16 | 1 | 11 | 5 | 10 | 7 | 15 | 4 | 2 | 6 | 13 | 14 | 12 | 3 | 8 | 9 |

In an embodiment, the detection unit 18 detects similarities between the selected dispatching rules and the scheduling result generated by the data unit 14 according to the optimal approximate solution technology. The mining unit 16 performs calculation for the selected dispatching rules a plurality of times, ranks the selected dispatching rules in ascending order of filter values, and compares the ranking with the ranking of the original dispatching rules in the data unit 14. Referring to Table 5, Table 6, and Table 7, 10 data sets are simulated by using a field scenario of 10 work orders and 10 machines, and a work time ranges from 1 to 100. Table 5, Table 6, and Table 7 simulate Table 2, Table 3, and Table 4. In Table 7, a vertical axis shows a dispatching rule ranking generated according to the optimal approximate technology and a ranking of selected dispatching rules of the disclosure, and a horizontal axis shows dispatching rules. A similarity relationship between the two rankings may be obtained by calculating a correlation therebetween by using, for instance, the Pearson correlation coefficient method, which is widely used to measure a degree of linear dependence between two variables. After the two rankings are substituted, a value 0.811765 may be obtained, which represents a high correlation, that is, a similarity of the disclosure is high. Therefore, a ranking similarity between the selected dispatching rules and the original dispatching rules is high, and the selected dispatching rules can replace the original dispatching rules, to save time required for regular dispatching rule simulation and dispatching rule screening. The disclosure may select any method that can be used to calculate a degree of linear dependence between two variables, and is not limited to the Pearson correlation coefficient method.

TABLE 5

| Dispatching rule | Data set 1 | Data set 2 | Data set 3 | Data set 4 | Data set 5 | Data set 6 | Data set 7 | Data set 8 | Data set 9 | Data set 10 | Average | Ranking |
|---|---|---|---|---|---|---|---|---|---|---|---|---|
| PD | 1081.8 | 1116 | 925.2 | 1026.2 | 1021 | 1037.2 | 1070 | 1071.2 | 936.2 | 1034.4 | 1031.92 | 13 |
| RT | 967.8 | 935.8 | 814.6 | 867 | 890.8 | 875.2 | 933.4 | 914.4 | 854.8 | 858.8 | 891.26 | 1 |
| DS | 1079.2 | 1098.4 | 910.4 | 1029.8 | 1041.6 | 1061.6 | 1068.6 | 1102.2 | 950.4 | 1033 | 1037.52 | 16 |
| SK | 1043 | 1127.2 | 921.8 | 1011 | 1010.8 | 1029 | 1072.8 | 1068.2 | 919.4 | 1025.8 | 1022.9 | 7 |
| LPT | 1102.6 | 1105.2 | 941.2 | 1009.4 | 1002.8 | 1019.2 | 1051.8 | 1070.8 | 1006.2 | 1013.6 | 1032.28 | 9 |
| SPT | 1067.4 | 1087.4 | 902.6 | 980.8 | 968.4 | 966.6 | 1070 | 1053.6 | 940.4 | 993.2 | 1003.02 | 5 |
| FOPNR | 1093.4 | 1121.6 | 909.8 | 1024.4 | 1033.8 | 1051 | 1028.4 | 1083.6 | 1020.8 | 1026.4 | 1039.32 | 14 |
| MOPNR | 1019 | 982.2 | 859.8 | 916.2 | 956.4 | 926.6 | 969 | 965 | 886.6 | 882 | 936.28 | 2 |
| S_OPN | 1019.2 | 1035 | 840.2 | 886.4 | 988.8 | 955.6 | 988.4 | 988 | 865 | 899 | 946.56 | 3 |
| S_PT | 1064.6 | 1126.8 | 897.2 | 1023.2 | 1011.2 | 1021.6 | 1066 | 1093.6 | 945.8 | 1025.6 | 1027.56 | 8 |
| DS_PT | 1084.6 | 1108 | 936 | 1010.8 | 1025.8 | 1020.6 | 1067.4 | 1083 | 947.4 | 1016.4 | 1030 | 10 |
| DS_OPN | 1074 | 1105.8 | 948.4 | 1016.4 | 1019.4 | 1042.6 | 1073.6 | 1087.4 | 953.6 | 1027 | 1034.82 | 15 |
| LWKR | 1083 | 1081 | 976.8 | 1044.2 | 1012.2 | 1009.8 | 1045.4 | 1071.8 | 1039.4 | 1019.8 | 1038.34 | 12 |
| MWKR | 1049.2 | 1118.8 | 921.8 | 1039.6 | 994.4 | 1041.6 | 1083.2 | 1094 | 893.8 | 1045.4 | 1028.18 | 11 |
| NINQ | 1090.8 | 1032.6 | 918.6 | 1005.6 | 1003.2 | 981.2 | 1030.6 | 1042.2 | 966.8 | 983 | 1005.46 | 6 |
| WINQ | 1068 | 1076.6 | 923 | 1004.2 | 985.2 | 987.8 | 991.6 | 1018.4 | 989 | 946.2 | 999 | 4 |

TABLE 6

| Rule | PD | RT | DS | SK | LPT | SPT | FOPNR | MOPNR |
|---|---|---|---|---|---|---|---|---|
| 1 | 140.065 | 458.555 | 161.118 | 368.958 | 334.688 | 381.563 | 216.279 | 375.181 |
| 2 | 270.840 | 482.155 | 208.390 | 318.694 | 200.571 | 264.116 | 196.154 | 388.164 |
| 3 | 258.030 | 530.803 | 238.327 | 424.078 | 280.000 | 222.037 | 231.000 | 402.020 |
| 4 | 245.073 | 434.159 | 236.042 | 380.000 | 280.000 | 300.000 | 120.000 | 300.000 |
| 5 | 178.125 | 427.021 | 163.636 | 233.829 | 179.782 | 230.034 | 200.727 | 388.000 |
| 6 | 319.729 | 498.016 | 236.143 | 336.356 | 254.031 | 292.114 | 145.600 | 302.225 |
| 7 | 214.310 | 398.462 | 230.290 | 368.090 | 320.104 | 172.200 | 160.216 | 332.416 |
| 8 | 240.000 | 488.250 | 183.333 | 437.798 | 276.121 | 345.507 | 114.545 | 488.889 |
| 9 | 183.317 | 390.151 | 171.483 | 460.000 | 200.000 | 240.000 | 140.000 | 340.000 |
| 10 | 232.500 | 462.018 | 214.560 | 400.000 | 300.000 | 360.000 | 160.000 | 480.000 |
| Average | 228.199 | 456.959 | 204.332 | 372.780 | 262.530 | 280.757 | 168.452 | 379.689 |
| Ranking | 16 | 1 | 13 | 6 | 10 | 7 | 15 | 3 |

| Rule | S_OPN | S_PT | DS_PT | DS_OPN | LWKR | MWKR | NINQ | WINQ |
|---|---|---|---|---|---|---|---|---|
| 1 | 371.042 | 368.958 | 140.065 | 185.250 | 216.279 | 368.958 | 205.434 | 241.597 |
| 2 | 382.198 | 318.694 | 270.840 | 254.510 | 144.000 | 318.694 | 262.295 | 242.032 |
| 3 | 442.018 | 424.078 | 258.030 | 250.031 | 242.034 | 424.078 | 284.118 | 310.714 |
| 4 | 360.000 | 380.000 | 245.073 | 241.778 | 120.000 | 380.000 | 340.000 | 340.000 |
| 5 | 323.505 | 233.829 | 178.125 | 159.828 | 140.250 | 233.829 | 299.130 | 316.376 |
| 6 | 323.505 | 336.356 | 319.729 | 340.140 | 115.200 | 336.356 | 440.945 | 278.277 |
| 7 | 334.205 | 368.090 | 214.310 | 228.000 | 179.351 | 368.090 | 274.029 | 262.030 |
| 8 | 516.247 | 437.798 | 240.000 | 228.133 | 198.333 | 437.798 | 242.277 | 221.227 |
| 9 | 360.000 | 460.000 | 183.317 | 162.351 | 140.000 | 460.000 | 220.000 | 200.000 |
| 10 | 480.000 | 400.000 | 232.500 | 216.918 | 300.000 | 400.000 | 220.000 | 340.000 |
| Average | 389.272 | 372.780 | 228.199 | 226.694 | 179.545 | 372.780 | 278.823 | 273.225 |
| Ranking | 2 | 5 | 11 | 12 | 14 | 4 | 8 | 9 |

TABLE 7

| | Applied dispatching rule | | | | | | | | | | | | | | |
|---|---|---|---|---|---|---|---|---|---|---|---|---|---|---|---|
| | PD | RT | DS | SK | LPT | SPT | FOPNR | MOPNR | S_OPN | S_PT | DS_PT | DS_OPK | LWKR | MWKR | NINQ | WINQ |
| Ranking of the disclosure | 16 | 1 | 13 | 6 | 10 | 7 | 15 | 3 | 2 | 5 | 11 | 12 | 14 | 4 | 8 | 9 |
| Implementation ranking | 13 | 1 | 16 | 7 | 9 | 5 | 14 | 2 | 3 | 8 | 10 | 15 | 12 | 11 | 6 | 4 |

Figure 6:
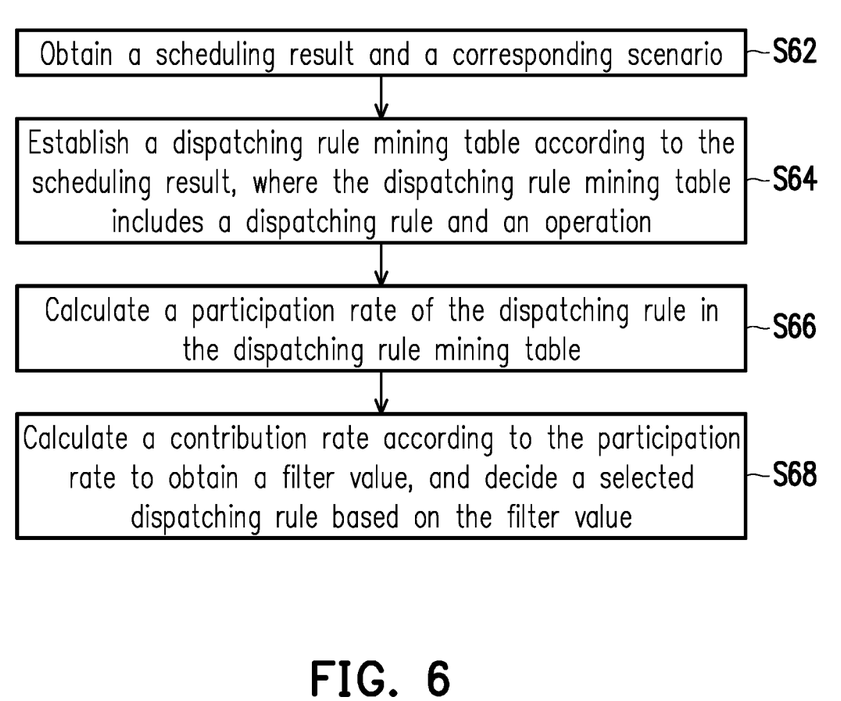
FIG. 6 is an example flowchart of quick dispatching rule screening according to an embodiment of the disclosure.

FIG. 6 is a flowchart of a quick dispatching rule screening method according to an embodiment of the disclosure. In the following embodiment, the quick dispatching rule screening apparatus 10 performs the quick dispatching rule screening method.

In step S62, the mining unit 16 obtains a stored scheduling result or corresponding scenario from the data unit 14. In an embodiment, the mining unit 16 obtains the scheduling result or the corresponding scenario from the user interface 19. In an embodiment, a scheduling target and available resources are selected, and a selected dispatching rule is output. In an embodiment, the data unit 14 may execute an irregular scheduling technology, for instance, the GA, to obtain the scheduling result. In an embodiment, the mining unit 16 may execute the irregular scheduling technology to calculate the scheduling result. The disclosure is not limited thereto.

In step S64, the mining unit 16 establishes a dispatching rule mining table according to the scheduling result. The dispatching rule mining table includes a dispatching rule and an operation. A horizontal axis of the dispatching rule mining table is the dispatching rule, and a vertical axis is the operation. In the dispatching rule mining table, a field where an operation satisfies a dispatching rule is represented by a binary code 1, and a field where an operation does not satisfy a dispatching rule is represented by a binary code 0. The disclosure is not limited thereto.

In step S66, the mining unit 16 calculates a participation rate of each dispatching rule in the dispatching rule mining table. The participation rate is obtained by dividing a quantity of dispatching rule fields where the dispatching rule is satisfied of the dispatching rule mining table by a total operation quantity. For instance, in FIG. 5A, a participation rate 0.143 of PD is obtained from 1/7 according to quantities of 0 and 1 in the PD fields of the dispatching rule mining table; for the RT fields, 0.571 is obtained from 4/7. In this example, a total quantity of operations is 7.

In step S68, the mining unit 16 calculates a contribution rate according to the participation rate to obtain a filter value, and decides a selected dispatching rule based on the filter value. The contribution rate is obtained by calculating an average of a plurality of the participation rates above a section line and a plurality of the participation rates below the second line. According to the selected dispatching rule, a high filter value is selected.

According to an embodiment of the disclosure, by simply calculating a participation rate, a contribution rate, and a filter value, time and costs required to simulate a scheduling result to screen out a proper dispatching rule can be saved, to achieve quick dispatching rule screening.

According to an embodiment of the disclosure, a similarity of the dispatching rule that is quickly screened out in the disclosure may be determined by detecting data of an actual field and data of a similar field, and from Table 2, Table 3, Table 4, Table 5, Table 6, and Table 7, it can be learned that the selected dispatching rules are highly similar to actual executed dispatching rules. Therefore, quick dispatching rule screening of the disclosure can replace existing regular dispatching rule screening.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A quick dispatching rule screening method, comprising:
    obtaining, by a processor, a scheduling result and a corresponding scenario;
    establishing, by the processor, a dispatching rule mining table according to the scheduling result, wherein the dispatching rule mining table reflects a participation status of a plurality of operations with respect to a plurality of candidate dispatching rules, and each of the operations are performed by one of a plurality of machines;
    calculating, by the processor, a participation rate of each of the candidate dispatching rules in the dispatching rule mining table;
    calculating, by the processor, a contribution rate according to the participation rate to obtain a filter value; and
    deciding, by the processor, a selected dispatching rule from the candidate dispatching rules based on the filter value.

2. The quick dispatching rule screening method according to claim 1, wherein the scheduling result is a Gantt chart.

3. The quick dispatching rule screening method according to claim 1, wherein the scheduling result is obtained by using an optimal approximate solution generator through convergence algorithm.

4. The quick dispatching rule screening method according to claim 1, wherein the corresponding scenario comprises:
    a field scenario, comprising a scheduling target and an available resource, wherein the available resource comprises a work order and a machine among the machines;
    a process, comprising at least one operation among the operations; and
    a start-end time.

5. The quick dispatching rule screening method according to claim 1, wherein in the dispatching rule mining table, a field where the operation satisfies the dispatching rule is represented by a binary code 1, and a field where the operation does not satisfy the dispatching rule is represented by a binary code 0.

6. The quick dispatching rule screening method according to claim 1, wherein the participation rate is obtained by dividing a quantity of dispatching rule fields where the dispatching rule is satisfied of the dispatching rule mining table by a total operation quantity.

7. The quick dispatching rule screening method according to claim 1, wherein the contribution rate is obtained by calculating an average of a plurality of the participation rates above a section line and a plurality of the participation rates below the section line.

8. The quick dispatching rule screening method according to claim 1, wherein the filter value is obtained through summation, multiplication, and division on a plurality of the contribution rates.

9. The quick dispatching rule screening method according to claim 1, wherein according to the selected dispatching rule a high filter value is selected.

10. The quick dispatching rule screening method according to claim 1, wherein the scheduling result and the corresponding scenario are input through a user interface, a scheduling target and an available resource are selected, and the selected dispatching rule is output.

11. The quick dispatching rule screening method according to claim 1, further comprising detecting a similarity between the selected dispatching rule and an original dispatching rule of the scheduling result and the corresponding scenario.

12. The quick dispatching rule screening method according to claim 1, further comprising detecting a similarity between the selected dispatching rule and a new dispatching rule of an input similar scheduling result and similar corresponding scenario.

13. A quick dispatching rule screening apparatus, comprising:
    a memory; and
    a processor, coupled to the memory and configured to:
    obtain a scheduling result or a corresponding scenario;
    establish a dispatching rule mining table according to the scheduling result, wherein the dispatching rule mining table reflects a participation status of a plurality of operations with respect to a plurality of candidate dispatching rules, and each of the operations are performed by one of a plurality of machines;
    calculate a participation rate of each of the candidate dispatching rules in the dispatching rule mining table;
    calculate a contribution rate according to the participation rate to obtain a filter value; and
    decide a selected dispatching rule from the candidate dispatching rules based on the filter value.

14. The quick dispatching rule screening apparatus according to claim 13, wherein the processor is further configured to obtain the scheduling result or the corresponding scenario through a user interface, select a scheduling target and an available resource, and output the selected dispatching rule.

15. The quick dispatching rule screening apparatus according to claim 13, wherein the scheduling result is a Gantt chart.

16. The quick dispatching rule screening apparatus according to claim 13, wherein the scheduling result is obtained by an optimal approximate solution generator through convergence algorithm.

17. The quick dispatching rule screening apparatus according to claim 13, wherein the corresponding scenario comprises:
    a field scenario, comprising a scheduling target and an available resource, wherein the available resource comprises a work order and a machine among the machines;
    a process, comprising at least one operation among the operations; and
    a start-end time.

18. The quick dispatching rule screening apparatus according to claim 13, wherein in the dispatching rule mining table, a field where the operation satisfies the dispatching rule is represented by a binary code 1, and a field where the operation does not satisfy the dispatching rule is represented by a binary code 0.

19. The quick dispatching rule screening apparatus according to claim 13, wherein the participation rate is obtained by dividing a quantity of dispatching rule fields where the dispatching rule is satisfied of the dispatching rule mining table by a total operation quantity.

20. The quick dispatching rule screening apparatus according to claim 13, wherein the contribution rate is obtained by calculating an average of a plurality of the participation rates above a section line and a plurality of the participation rates below the section line.

21. The quick dispatching rule screening apparatus according to claim 13, wherein the filter value is obtained through summation, multiplication, and division on a plurality of the contribution rates.

22. The quick dispatching rule screening apparatus according to claim 13, wherein according to the selected dispatching rule a high filter value is selected.

23. The quick dispatching rule screening apparatus according to claim 13, wherein the processor is further configured to detect a similarity between the selected dispatching rule and an original dispatching rule of the scheduling result and the corresponding scenario.

24. The quick dispatching rule screening apparatus according to claim 13, wherein the processor is further configured to detect a similarity between the selected dispatching rule and a new dispatching rule of an input similar scheduling result and similar corresponding scenario.

* * * * *